United States Patent

Fukumoto et al.

Patent Number: 5,780,165
Date of Patent: Jul. 14, 1998

[54] BEARING STEEL BEARING MEMBER HAVING EXCELLENT THERMAL RESISTANCE AND TOUGHNESS

[75] Inventors: Shiho Fukumoto, Yasugi; Hideki Nakamura, Yonago, both of Japan

[73] Assignee: Hitachi Metals, Ltd., Tokyo, Japan

[21] Appl. No.: 565,044

[22] Filed: Nov. 30, 1995

[30] Foreign Application Priority Data

Apr. 27, 1995 [JP] Japan ................. 7-103839

[51] Int. Cl.$^6$ ............ C22C 38/44; C22C 38/46; F16C 33/30
[52] U.S. Cl. .......... 428/472.1; 148/335; 420/109; 420/111; 384/492; 384/625; 384/912; 384/913
[58] Field of Search ............... 148/206, 210, 148/333, 334, 335; 420/104, 109, 111; 384/492, 625, 912, 913; 428/610, 627, 472.1

[56] References Cited

U.S. PATENT DOCUMENTS

| | | | |
|---|---|---|---|
| 3,682,519 | 8/1972 | Shepelyakovsky et al. | 308/212 |
| 3,885,995 | 5/1975 | Cunningham et al. | 148/319 |
| 4,358,317 | 11/1982 | Abe | 420/111 |
| 4,659,241 | 4/1987 | Bamberger et al. | 384/625 |
| 4,729,872 | 3/1988 | Kishida et al. | 420/109 |
| 4,886,640 | 12/1989 | Garner, Jr. et al. | 420/111 |
| 5,030,017 | 7/1991 | Murakami et al. | 384/492 |
| 5,084,116 | 1/1992 | Mitamura | 384/492 |
| 5,131,964 | 7/1992 | Spitzer | 148/319 |

FOREIGN PATENT DOCUMENTS 55-69247   5/1980   Japan ................. 420/109

OTHER PUBLICATIONS

Machine Design, *Rolling Elements Bearings*, Jun. 22, 1972, pp. 59-75.

*Primary Examiner*—John J. Zimmerman
*Attorney, Agent, or Firm*—Sughrue, Mion, Zinn, Macpeak & Seas, PLLC

[57] ABSTRACT

There is disclosed a bearing member which is enhanced in toughness without lowering the hardness of a core portion so as to prevent an instantaneous rupture of the bearing member, and is excellent in rolling fatigue service life characteristics. Martensitic Fe-based bearing steel of the invention contains, by weight, not more than 0.4% carbon, not more than 2% silicon, not more than 2% manganese, not more than 5% nickel, 3.5 to 7.0% chromium, at least one of tungsten and molybdenum an tungsten equivalent defined by ([W]+2[Mo]) of which at least one is 3 to 15%, and not less than 0.5% but less than 1.1% vanadium. A ratio of Cv/Ceq is not more than 0.3 where Cv represents a carbon equivalent of vanadium defined by 0.2[V], and Ceq represents a carbon equivalent of carbide-forming elements defined by (0.063 [Cr]+0.06[Mo]+0.033[W]+0.2[V]). With this construction, the precipitation of MC carbides is suppressed, and $M_2C$-type carbides larger in morphology than MC-type carbides are dispersed in an appropriate amount, thereby enhancing a rupture toughness value.

7 Claims, 4 Drawing Sheets

1

BEARING STEEL BEARING MEMBER HAVING EXCELLENT THERMAL RESISTANCE AND TOUGHNESS

BACKGROUND OF THE INVENTION

This invention relates to bearing steel and a bearing member suited for use under severe conditions as in a bearing of a gas turbine engine or the like, and also relates to a method of producing such a bearing member.

A member, used in a bearing of a gas turbine engine or the like, has heretofore been made of bearing steel such as AISI M50 (Cr-Mo-V high-speed tool steel) having excellent thermal resistance.

Recently, a gas turbine has been designed to achieve a high efficiency, and bearing steel has now been required to be excellent not only in thermal resistance but also in durability when used as a bearing member, that is, to have high rolling fatigue service life characteristics.

There has been proposed one method of enhancing rolling fatigue service life characteristics of a bearing, as disclosed in U.S. Pat. No. 4,659,241, in which a surface of the bearing is carburized and heat-treated, thereby imparting residual compressive stresses to the surface, and also increasing surface hardness and high-temperature hardness, while a core portion of the bearing not carburized remains unchanged in composition, and hence has a low carbon content and excellent toughness. The technique of carburizing a surface of a bearing to thereby impart residual compressive stresses to the surface is disclosed, for example, in U. S. Pat. No. 3,682,519, "MACHINE DESIGN 22nd Jun. 1972, Pages 59–75"and "Rolling-element bearings, particularly Page 69".

This technique is to suppress the growth of a crack, formed in the high-hardness surface, by residual compressive stresses imparted to the carburized surface, and also to suppress the development of a crack in the core portion by keeping the core portion (i.e., non-carburized portion) to low hardness and high toughness.

In the above U.S. Pat. No. 4,659,241, it is mentioned that when Cr-Mo-V bearing steel, which has a lower carbon content than M50 and which contains 0.11~0.15% carbon, 4.0~4.5% Molybdenum, 4.0~4.25% chromium, 1.1~1.3% vanadium, 3.2~3.6% nickel, and the balance Fe, is carburized, a bearing member excellent particularly in rolling fatigue service life characteristics is obtained.

Recently, a high-efficiency design of a gas turbine engine has been further advanced. As an index representative of a load on a bearing member, there has been used a DN value representing the product of a diameter D (mm) of the bearing member and a rotational speed N (rpm). At present, bearing members have now been required to be used under conditions in which the DN value is higher, and thus the bearing members have now been increasingly required to withstand a high load.

When the DN value increases, a tensile stress develops in the bearing member, and once a crack develops, the growth of the crack is fast, so that there is a possibility that the crack soon grows into a large size.

In the bearing member used under a high-speed, high-load condition as in a gas turbine engine, when a crack grows into such a large size, the gas turbine itself may be destroyed, which may lead to a serious accident.

Therefore, in the bearing member for a gas turbine or the like, it is most important to prevent the development of such a large crack, and the bearing member has now been required to have higher toughness and particularly a high rupture toughness value.

In the above-mentioned bearing steel with a lower carbon content than that of M50, which is carburized to be used as a bearing member, it is important that the core portion not carburized should have a high rupture toughness value (hereinafter referred to merely as "toughness") in order to prevent the development of the above large crack.

However, a study by the inventor of the present invention indicates that when the above-mentioned bearing steel lower in carbon content than M50 has hardness of about 44 HRC which is practical hardness of bearing members, it exhibits toughness of less than bout 60 MPam$^{1/2}$ at best.

As described above, the bearing member used in gas turbine engine or the like is required not only to withstand a high load but also to have thermal resistance, and therefore Cr and Mo or W and V are essential for obtaining the thermal resistance, and it is necessary to enhance the toughness without degrading the above properties or characteristics brought about by the basic components of M50.

The core portion of the bearing member need to have a sufficient strength to withstand a load acting on the surface thereof, and therefore it is impossible to use a method of increasing the toughness while lowering hardness.

Toughness and hardness are the properties contrary to each other; however, in order to achieve sufficiently-excellent rolling fatigue service life characteristics under a condition in which the DN value is high, there is a demand for a bearing member enhanced in both toughness and hardness without the sacrifice of one of them.

SUMMARY OF THE INVENTION

With the above problems in view, it is an object of this invention to provide a bearing member and bearing steel for forming this bearing member, in which a core portion of the bearing member is enhanced in toughness while preventing its hardness from being lowered, thereby preventing an instantaneous rupture of the bearing member, and excellent rolling fatigue service life characteristics are achieved.

In order to prevent an instantaneous rupture of a bearing member, the inventors of the present invention have conceived a combination of a core portion of high toughness and a carburized layer of high thermal resistance.

It may be proposed to decrease the hardness or to greatly reduce the content of carbides. With such a method, however, the strength and thermal resistance of the core portion are not satisfactory.

More specifically, it is necessary that the material constituting the core portion should contain a certain amount of elements, such as Cr, W and Mo, which form carbides, and are present in a solid-solution state in the matrix, thereby increasing the strength.

Therefore, in the present invention, it has been proposed to control the amount and morphology of MC-type carbides and $M_2C$-type carbides, formed in a microstructure of the core portion-constituting material, so as to suppress the growth of a crack.

As a result, the inventors of the present invention have discovered that the amount of vanadium, forming the MC-type carbides, has a great influence on the toughness, and that basically, the growth of a crack is effectively suppressed when the amount of vanadium is made to be lower than that of conventional M50 class steel while the precipitation of the MC carbides is suppressed and when the $M_2C$-type carbides greater in morphology than the MC-type carbides are dispersed in an appropriate amount.

Namely, in the present invention, it has been discovered for the first time that not only the ratio of the main constituent elements but also the ratio of the MC-type carbides to the $M_2C$-type carbides are important, and it has been discovered that this carbide content ratio can be defined in terms of the ratio of the carbon equivalent of vanadium (Cv), which represents an amount of carbon able to be combined with vanadium, to the carbon equivalent (Ceq) which represents another amount of carbon able to be combined with all the carbon-forming elements.

According to one aspect of the present invention, there is provided martensitic Fe-based bearing steel containing, by weight, not more than 0.4% carbon, not more than 2% silicon, not more than 2% manganese, not more than 5% nickel, 3.5 to 7.0% chromium, at least one of tungsten and molybdenum and tungsten equivalent defined by ([W]+2 [Mo]) of which at least one is 3 to 15%, and not less than 0.5% but less than 1.1% vanadium, a ratio of Cv/Ceq being not more than 0.3 where Cv represents a carbon equivalent of vanadium defined by 0.2[V], and where Ceq represents a carbon equivalent of carbide-forming elements defined by (0.063[Cr]+0.06[Mo]+0.033[W]+0.2[V]), and the bearing steel being carburized when the steel is used.

In the present invention, Fe is used as the base element, and C, Ni, Cr, V and at least one of W and Mo are contained as essential elements in their respective ranges mentioned above. Other optional elements may be added if necessary.

A more specific, preferred example of the invention is martensitic Fe-based bearing steel containing, by weight, not more than 0.1 to 0.3% carbon, not more than 1% silicon, not more than 1% manganese, 1 to 5% nickel, 3.5 to 7.0% chromium, at least one of tungsten and molybdenum and tungsten equivalent defined by ([W])+2[Mo]) of which at least one is 3 to 12%, and not less than 0.5% but less than 1.0% vanadium.

Part of Fe may be replaced by not more than 10% Co.

A bearing member of the present invention is produced by forming a carburized layer in part or the whole of a surface of the above bearing steel of the novel composition.

In the present invention, a core portion of the bearing member except the carburized portion is reduced in vanadium content, thereby controlling kinds and size of carbides as described later, so that a high toughness value can be obtained.

In a method of the present invention, a lattice strain is imparted to the bearing member by a carburizing treatment, and subsequently a heat treatment is applied to the bearing member, so that residual stresses can be imparted to the carburized layer by transformation stresses and thermal stresses.

The hardness of the surface having the carburized layer formed therein, as well as the hardness of the core portion, can be adjusted by conditions of the heat treatment (i.e., quenching and tempering treatments) effected after the carburizing treatment.

One major feature of the present invention is that when the hardness of the core portion is adjusted to a predetermined value by this heat treatment in order to keep the basic strength, the bearing member of the invention becomes far higher in toughness than the conventional bearing members.

In the present invention, particularly in a case where the bearing member is required to have an increased strength depending on its use, the hardness of the core portion is adjusted to not less than 50 HRC. Preferably, this hardness is kept to be in the range of 50 to 58 HRC.

In a case where increased toughness is required, the hardness of the core portion is adjusted to the range of between 38 HRC and 50 HRC in order to keep sufficient hardness of the core portion.

Preferably, the hardness of the surface having the carburized layer formed therein should be not less than 58 HRC in order to enhance rolling fatigue service life characteristics, and more preferably this hardness is not less than 60 HRC.

As described above, in the present invention, the precipitation of the MC carbides in the core portion is suppressed, and the $M_2C$-type carbides greater in morphology than the MC-type carbides are dispersed in an appropriate amount in the structure, thereby suppressing the growth of a crack in the bearing member.

Therefore, in the present invention, not only the ratio of the main constituent elements but also the ratio of the MC-type carbides (which are composed predominantly of VC) to the $M_2C$-type carbides are important.

In the present invention, it has been found that when the ratio of Cv/Ceq is kept to be not more than 0.3, the content ratio of the MC-type carbides to the $M_2C$-type carbides is made optimum.

This content ratio is expressed in terms of the ratio of the carbon equivalent (Cv) of vanadium to the carbon equivalent (Ceq) able to be combined with all the carbide-forming elements.

In a case where the value of Cv/Ceq is more than 0.3, electron-beam diffraction patterns of the MC-type and $M_2C$-type carbides are positively detected in the secondary hardening precipitation of the tempered structure of the core portion, and thus the clear presence of the MC carbides is confirmed. In contrast, in another case where the value of Cv/Ceq is less than 0.3, the diffraction pattern of the MC-type carbides are recognized locally, and the $M_2C$-type carbides are predominant in the structure. In the present invention, the $M_2C$-type carbides, which are highly effective in suppressing the growth of a crack, are kept. When the core portion of the bearing member of the invention is adjusted by quenching and tempering into the predetermined hardness, it exhibits much higher toughness than conventional M50-based steel (which is carburized in use) adjusted to the same hardness.

One of the most important elements for keeping the above structure is vanadium (V). Vanadium is a strong carbide-forming element, and when a large amount of vanadium is present in a composition with a low carbon content, most of the carbon are combined with the vanadium to form a MC-type carbide.

In such a case, even if Cr, W and Mo, which are lower in energy of bonding to carbon than vanadium, are added in a large amount, a sufficient amount of $M_2C$-type carbides capable of preventing the growth of a crack can not be present in the structure. As a result, the toughness of the core portion of the bearing member can not be increased.

Therefore, it is necessary to limit an upper level on the amount of vanadium, and in the present invention, the amount of vanadium is less than 1.1%.

If the amount of Cr and W or Mo is small though the vanadium content is less than 1.1%, the MC-type carbides composed predominantly of MC are present in a larger amount, so that a sufficient amount of the $M_2C$-type carbides enhancing toughness may not be obtained.

Therefore, in the present invention, the value of Cv/Ceq is kept to be not more than 0.3 as described above, thereby limiting the amount of vanadium relative to the total amount of the carbide-forming elements.

In the present invention, the lower limit of the vanadium content is 0.5%.

If the vanadium content is less than 0.5%, enhanced thermal resistance (which is a basic nature of a high-speed tool steel composition in a carburized layer) achieved by the addition of vanadium (, that is, characteristics by which the surface hardness is maintained even in temperature rise when the steel is used as a bearing) is degraded though toughness is high, so that the rolling fatigue service life characteristics are degraded. This is not desirable. Similarly, vanadium is essential for maintain the hardness of the core portion at high temperatures to ensure the strength. Therefore, it has been decided that the lower limit of the vanadium content is 0.5%.

The reasons for determining the amounts or contents of other elements than vanadium will be explained below.

Carbon (C) is the next to vanadium in importance, and is an element which determines the basic toughness and hardness of the bearing steel carburized in use. Carbon causes quenching hardening through a martensite transformation to thereby increase the hardness. Carbon is also the austenite stabilizing element, and has the effect of suppressing the formation of $\delta$ ferrite, adversely affecting the toughness, when the steel is heated to an austenitizing temperature. In contrast, if the carbon content is too high, the hardness becomes too high, so that the toughness is lowered.

In the present invention, the bearing steel is carburized when it is used, and therefore it is most important to keep the toughness of the core portion not carburized, and it has been decided that the upper limit of the carbon content is 0.4% so as to prevent the lowering of the toughness due to an excessive amount of the resulting carbides. Preferably, the carbon content is not less than 0.1% in order to suppress the formation of $\delta$ ferrite. A preferred range, which can suppress the formation of the $\delta$ ferrite without excessively lowering the toughness, is 0.1~0.3%.

Chromium (Cr) is present in a solid-solution state in both the matrix and the carbides, and is effective in keeping the quenching capability of the matrix, promoting the solid solution of carbide into the matrix at the time of quenching, and making the hardness of the carburized surface high. Chromium is important for keeping the basic thermal resistance of the high-speed tool steel composition obtained after carburization. If the chromium content is less than 3.5%, the toughness after quenching and tempering is lowered, and therefore it has been decided that its lower limit is 3.5%. If more than 7.0% chromium is added, the $\delta$ ferrite is stabilized, so that the toughness is markedly degraded. Therefore, the chromium content should be not more than 7%.

Tungsten (W) and molybdenum (Mo) achieve the same effects, and more specifically enhance the hardness of the carburized portion of the bearing member, and impart thermal resistance. One or both of the two elements are added. By weight, 1% Mo is equivalent to 2% W, and these are defined by the tungsten equivalent (W+2Mo). Tungsten or molybdenum, when carburized, forms a fine $M_6C$-type carbide to form the hard carburized layer. Besides, the fine carbides prevent austenite crystal grains from becoming coarse, and therefore tungsten and molybdenum are effective in keeping the toughness.

However, although the hardness of the carburized portion is increased with the increase of the tungsten equivalent, the core portion not carburized is also increased in hardness, so that the speed of growth of a crack becomes higher.

If the tungsten equivalent is too high, the $\delta$ ferrite is stabilized, thereby adversely affecting the toughness.

In the present invention, the tungsten equivalent is not less than 3% in order to achieve a sufficient surface hardness for the bearing member, and the upper limit of the tungsten equivalent is 15% in order to keep the sufficient toughness.

The preferred upper limit is 12%.

In the composition of the bearing member of the invention, as other carbide-forming elements than vanadium, the above Cr and Mo or W are added. Cr, Mo or W forms the $M_2C$-type carbide in the bearing member core portion having a low carbon content, as described above.

Therefore, the addition of Cr, Mo or W is essential in order to suppress the formation of the MC-type carbides, composed predominantly of V, to thereby keep the toughness of the core portion of the bearing member, and it is necessary to keep the above lower limit or more of these elements so as to ensure the presence of the $M_2C$-type carbides.

Therefore, in the present invention, attention has been directed to the carbon equivalent Cv of vanadium (which represents the carbon amount calculated by Cv=0.2[V]) consumed in V of which the MC-type carbides are predominantly composed, and the carbon equivalent Ceq (which represents the carbon amount calculated by Ceq=0.063[Cr]+0.06[Mo]+0.033[W]+0.2[V]) consumed in the carbide-forming elements Cr, Mo, W and V.

More specifically, the $M_2C$-type carbides, which are larger in size and faster in growth than the MC-type carbides, are precipitated to serve to stop the growth of a crack. In other words, in the present invention, the $M_2C$-type carbides are adopted in preference to the MC-type carbides. Therefore, in the present invention, Cv/Ceq $\leq$0.3 in terms of the carbon equivalent is adopted, and thus Ceq is larger than Cv.

In the present invention, there is adopted the composition range having a low carbon content on the order of not more than 0.4 and preferably not more than 0.3% because carbon is apt to cause $\delta$ ferrite adversely affecting the toughness. Also, in the present invention, there is adopted the composition range containing a large amount of each of Cr, Mo and W (3.5~7.0% Cr and 3~15% of at least one of Mo and W in terms of the tungsten equivalent) stabilizing $\delta$ ferrite.

Therefore, in such a composition system, it is essential to suppress the formation of the $\delta$ ferrite.

In the present invention, nickel (Ni) is added in order to suppress the formation of the $\delta$ ferrite.

Nickel is one of the most important elements for suppressing the formation of the $\delta$ ferrite so as to keep the toughness of the bearing member of the present invention.

Nickel is quite important in suppressing the formation of the $\delta$ ferrite, and also in enhancing the toughness when the amount of addition thereof is increased.

Nickel also achieves the effect of bringing about gradual change of the hardness of the carburized surface, and therefore is effective in enhancing the rolling fatigue service life characteristics.

However, if the nickel content is more than 5%, a $A_1$ transformation point is lowered, and the annealing hardness is increased, thereby adversely affecting the machinability of the bearing material. Therefore, this content is not more than 5%. A preferred range thereof is not less than 1%, and a more preferred range is not less than 2% but not more than 5%.

Silicon (Si) is added as a deoxidizing element and also in order to enhance the hardness and heat resistance. However, if the amount of addition is more than 2%, the toughness is adversely affected, and therefore its upper limit is 2%.

Manganese (Mn) serves as a deoxidizing element, or precipitates as MnS to suppress an adverse effect of S contained as an impurity. In contrast, if this content is more than 2%, the toughness is adversely affected, and therefore its upper limit is 2%.

Cobalt (Co) is mainly present in a solid-solution state in the matrix to enhance the hardness and thermal resistance. However, as this content is increased, the strength and toughness gradually decrease. It is preferred that this element be added particularly in a case where a bearing member is required to have high hardness.

The addition of more than 10% cobalt excessively degrades the toughness, so that the steel is not suited for a bearing member. Therefore, its upper limit is 10%.

Another element that can be added in the present invention is niobium (Nb). This element is effective in making the alloy structure fine.

If niobium is added in an excessive amount, the hardness increases, so that the speed of growth of a crack becomes high. Therefore, the amount of niobium, if added, should be not more than 0.5%.

A specific example of bearing steel of the invention containing niobium contains, by weight, not more than 0.1~0.4% carbon, not more than 2% silicon, not more than 2% manganese, not more than 5% nickel, 3.5 to 7.0% chromium, at least one of tungsten and molybdenum and tungsten equivalent defined by ([W]+2[Mo]) of which at least one is 3 to 15%, not less than 0.5% but less than 1.1% vanadium, not more than 0.5% niobium, and the balance iron, wherein Cv/Ceq $\leq 0.3$ is satisfied as described above.

When the bearing steel of the present invention satisfies the above requirements, the hardness of the carburized layer is not less than 58 HRC, and the hardness of the core portion except the carburized portion is less than 58 HRC.

A roller bearing shown in FIG. 7 is a specific example of the bearing provided with the bearing member(s) embodying the invention, which FIG. 7 is viewed in an axial direction of the bearing. The bearing member of the invention may be, for example, an outer race (1) and/or an inner race (2) shown in FIG. 7.

When there is used the bearing member-producing method of the present invention in which the bearing steel is subjected to the carburizing treatment and subsequently to quenching and tempering, it becomes possible to make compressive stresses remain in the surface. In this compressive stress field, the growth of a crack at the surface can be suppressed, and also the growth of a crack in the core portion can be prevented because of the most important feature of the present invention that the core portion has high toughness. Therefore, the rolling fatigue service life characteristics of the bearing member can be markedly enhanced.

DESCRIPTION OF THE PREFERRED EMBODIMENTS

EXAMPLE 1

Figure 1:
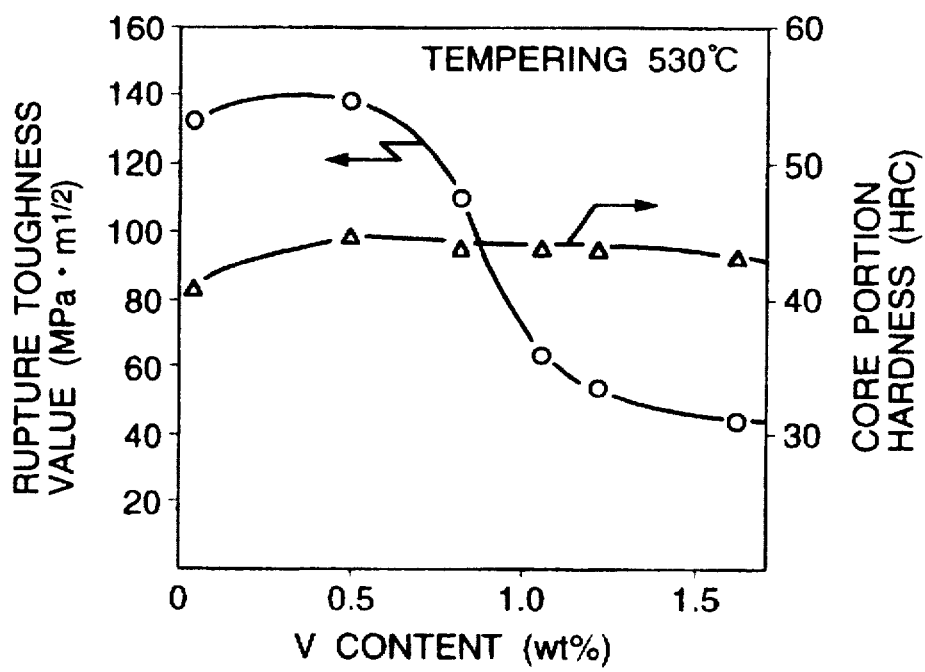
FIG. 1 is a diagram showing the relation between a vanadium content of samples tempered at 530° C. and a rupture toughness value, as well as the relation between the vanadium content and the hardness of a core portion.

Materials, having respective compositions (having different vanadium contents) shown in Table 1, were melted and prepared by a vacuum melting method.

Each of the thus prepared materials was forged by hot working to provide a sheet material with a cross-sectional size of 22 mm'47 mm which corresponds to bearing steel of the present invention. Test pieces for a rupture toughness test were taken from each sheet material.

Also, each of the above prepared material was drawn by hot working to provide a round bar with a diameter of 22 mm which corresponds to bearing steel of the present invention. Test pieces for a 2 mm U-notch Charpy impact test were taken from each round bar.

The thus obtained rupture toughness test pieces and Charpy impact test pieces were quenched at 1,100° C. without carburization, and was subjected to tempering in which the test pieces were maintained at 530° C. for one hour, then cooled by the air, then heated to 530° C. again, maintained at this temperature for one hour, and then was cooled by the air. Another group of samples of the test pieces were prepared by a similar heat treatment in which a tempering temperature was changed to 590° C. These samples were prepared for evaluating characteristics or properties of core portions of bearing members.

Using these test pieces, the rupture toughness value, the hardness corresponding to the hardness of the core portions after carburization, and the Charpy impact value were measured at room temperature.

The above conditions correspond to the conditions of quenching and tempering after the carburizing treatment, and serve to evaluate the relation between the hardness of the core portion of the bearing member and the toughness thereof. A δ ferrite area (%) in a microstructure is shown in Table 1, and in all of Sample Nos. 1 to 3 of the present invention, no δ ferrite more than 0.1% area (which is an observable limit) was present.

In all of Sample Nos. 1 to 3 of the invention, as well as both of Comparative Sample Nos. 4 and 5, the carbon content is in the low range defined by the present invention, and the tungsten equivalent (W+2Mo) is higher as compared with the conventional bearing steel. In this case, the δ ferrite is liable to be formed; however, around 3.4% niobium is added in each of these samples, and this greatly serves to prevent the formation of the δ ferrite.

On the other hand, in Sample No. 6 whose vanadium content is much higher than that defined by the present invention, the presence of the δ ferrite can be confirmed.

This indicates that if the amount of addition of vanadium is excessive, the toughness is lowered by the formation of the δ ferrite.

into the range defined by the present invention, the diffraction image indicative of the MC-type carbides is recognized only locally, and it was judged that a large proportion of the

TABLE 1

| | COMPOSITION (wt %) | | | | | | | | | | | | | | δ FERRITE | |
|---|---|---|---|---|---|---|---|---|---|---|---|---|---|---|---|---|
| No | C | Si | Mn | Ni | Cr | W | Mo | V | Co | Nb | W + 2Mo | Fe | Ceq | Cv | Cv/Ceq | AREA % | NOTE |
| 1 | 0.13 | 0.21 | 0.23 | 3.44 | 4.21 | — | 4.25 | 0.52 | — | — | 8.50 | Bal. | 0.62 | 0.10 | 0.17 | <0.1 | STEEL OF THE INVENTION |
| 2 | 0.14 | 0.19 | 0.24 | 3.41 | 4.25 | — | 4.26 | 0.83 | — | — | 8.52 | Bal. | 0.69 | 0.17 | 0.24 | <0.1 | STEEL OF THE INVENTION |
| 3 | 0.13 | 0.17 | 0.21 | 3.44 | 4.20 | — | 4.22 | 1.06 | — | — | 8.44 | Bal. | 0.73 | 0.21 | 0.29 | <0.1 | STEEL OF THE INVENTION |
| 4 | 0.13 | 0.22 | 0.23 | 3.43 | 4.18 | — | 4.20 | 1.22 | — | — | 8.40 | Bal. | 0.76 | 0.24 | 0.32 | <0.1 | COMPARATIVE STEEL |
| 5 | 0.13 | 0.22 | 0.24 | 3.39 | 4.20 | — | 4.26 | 0.05 | — | — | 8.52 | Bal. | 0.53 | 0.01 | 0.02 | <0.1 | COMPARATIVE STEEL |
| 6 | 0.13 | 0.21 | 0.22 | 3.35 | 4.21 | — | 4.24 | 1.62 | — | — | 8.48 | Bal. | 0.84 | 0.32 | 0.38 | 4.6 | COMPARATIVE STEEL |

FIG. 1 shows the rupture toughness value and the hardness of the core portion with respect to the samples of the invention and comparative samples whose tempering temperature was 530° C.

Figure 2:
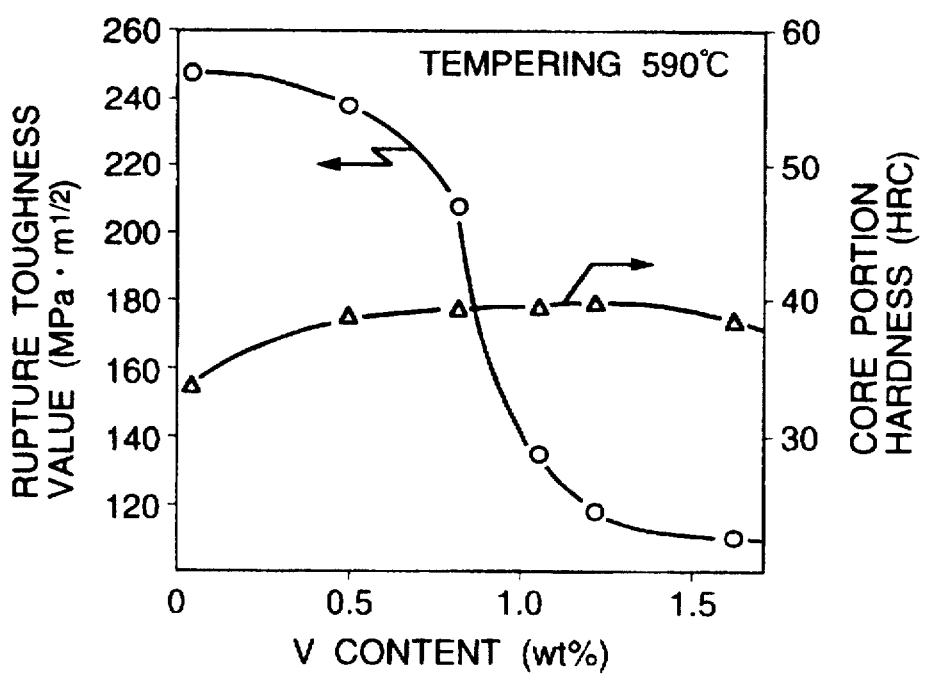
FIG. 2 is a diagram showing the relation between a vanadium content of samples tempered at 590° C. and a rupture toughness value, as well as the relation between the vanadium content and the hardness of a core portion.

FIG. 2 shows the rupture toughness value and the hardness of the core portion with respect to the samples whose tempering temperature was 590° C. In each of FIGS. 1 and 2, two curves represent the two characteristics or properties indicated by relevant arrows, respectively.

From FIG. 1, showing a change of the rupture toughness value of the samples whose tempering temperature was 530° C. and FIG. 2 showing a change of the rupture toughness value of the samples whose tempering temperature was 590° C., it will be appreciated that each of these rupture toughness values is markedly improved from a point corresponding to Sample No. 3 of the invention (in which the vanadium content is 1.06% with Cv/Ceq=0.29) to a region where the vanadium content is lower with the lower value of Cv/Ceq. As shown in FIGS. 1 and 2, the hardness at this time is hardly changed. This indicates that the toughness can be increased while keeping the strength generally at the same level, by making the amount of carbon consumed in MC smaller as compared with the amount of carbon consumed in other $M_2C$-type, that is, by lowering the value of Cv/Ceq.

Figure 3:
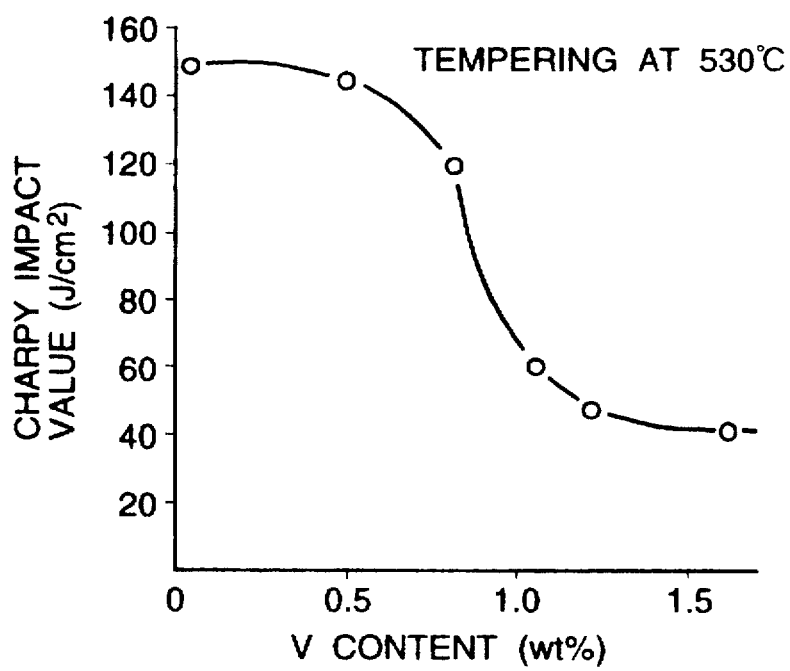
FIG. 3 is a diagram showing the relation between a vanadium content of samples tempered at 530° C. and a Charpy impact value.
Figure 4:
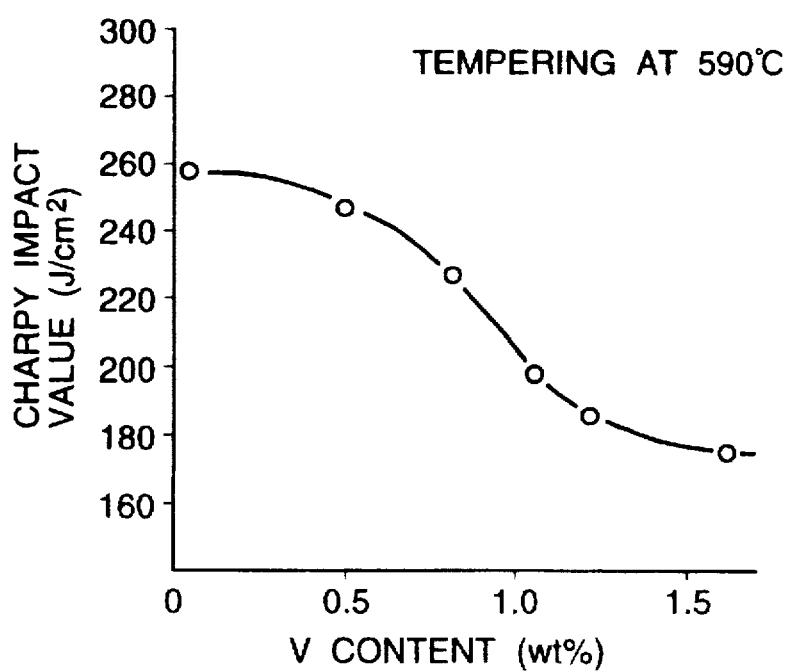
FIG. 4 is a diagram showing the relation between a vanadium content of samples tempered at 590° C. and a Charpy impact value.

FIG. 3 shows a change of the Charpy impact value of the samples whose tempering temperature was 530° C., and FIG. 4 shows a change of the Charpy impact value of the samples whose tempering temperature was 590° C. As will be appreciated from FIGS. 3 and 4, the Charpy impact value, like the rupture toughness value, is markedly improved from a point corresponding to Sample No. 3 of the invention (in which the vanadium content is 1.06% with Cv/Ceq=0.29) to a region where the vanadium content is lower with the lower value of Cv/Ceq.

Thus, it is quite advantageous also from the view point of the impact value to set the value of Cv/Ceq to not more than 0.3 so as to keep the toughness of the core portion of the bearing member.

An attempt was made to identify the kind of the carbides of the tempered structure through an electron-beam diffraction by a transmission-type electronic microscope. As a result, in Sample No. 4 whose vanadium content is higher than the range defined by the present invention, diffraction images of both MC-type and $M_2C$-type carbides were recognized; however, as the vanadium content was decreased structure was occupied by the $M_2C$-type carbides. Therefore, it was judged that the toughness of the bearing member of the invention is enhanced by causing the $M_2C$-type carbides to occupy a large proportion of the structure.

Upon evaluating the hardness of the samples whose tempering temperature was 590° C., the hardness of Sample No. 2 of the invention was 39.6 HRC, the hardness of Comparative Sample No. 4 with a higher vanadium content was 40.2 HRC, and the hardness of Comparative Sample No. 5 whose vanadium content was lower than the range defined by the invention was 33.5 HRC, as shown in FIG. 2. Thus, it is appreciated that the addition of vanadium is necessary for keeping the high-temperature hardness.

Therefore, it is necessary to determine the proper lower limit of the vanadium content, and as will be appreciated from a change of the hardness (FIG. 2) of the samples whose tempering temperature was 590° C., if not less than 0.5% vanadium is added, the influence of the amount of vanadium on the hardness is decreased, which is desirable.

Next, in order to evaluate rolling fatigue service life characteristics of carburized bearing members, round bars with a diameter of 22 mm were prepared according to the same procedure as described above for the test pieces for the 2 mm U-notch Charpy impact test, and then test pieces with a diameter of 22 mm and a length of 22 mm were taken from these round bars.

In order to evaluate carburized bearing members, each of these rolling fatigue test pieces was carburized to a depth of 2~3 mm at 950° C. for 48 hours, and as described above for the Charpy test pieces and the rupture toughness test pieces, one group of test pieces were tempered at 530° C. and the other group of test pieces were tempered at 590° C., and the surface of each test piece was shaved in an amount of 0.5 mm, and then the shaved test pieces were subjected to the rolling fatigue test.

The purpose of thus removing the outer surface layer from the test piece is to remove the layer containing a large amount of a residual austenitic structure of low hardness which is formed during the carburization.

When residual stresses in the surface were measured by X-ray diffraction, it was confirmed that compressive stresses of not less than −100 MPa were present in all of the samples.

With respect to the test conditions, the test was conducted at 210° C., the maximum Hertz pressure of 4.8×10N/mm$^2$ and a rotational speed of 10,000 rpm, and the evaluation was made with L10 (10% cumulative non-loss factor) service life. More specifically, L10 means a service life at which ten out of a hundred of test pieces remain not damaged by defects such as flaking and etc. at a rolling surface.

Figure 5:
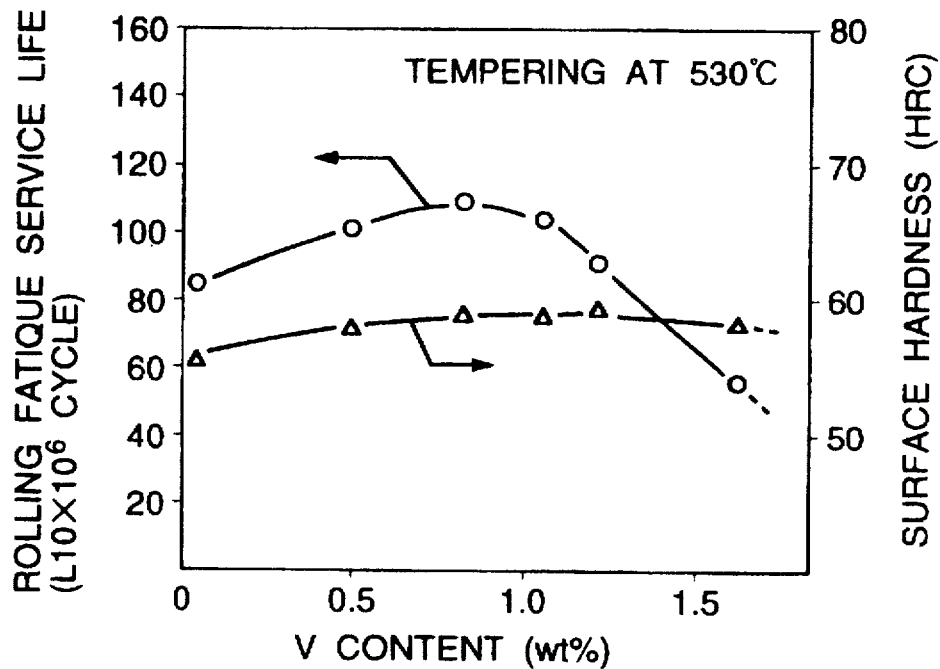
FIG. 5 is a diagram showing the relation between a vanadium content of samples tempered at 530° C. and a rolling fatigue service life, as well as the relation between the vanadium content and the hardness of a carburized surface.
Figure 6:
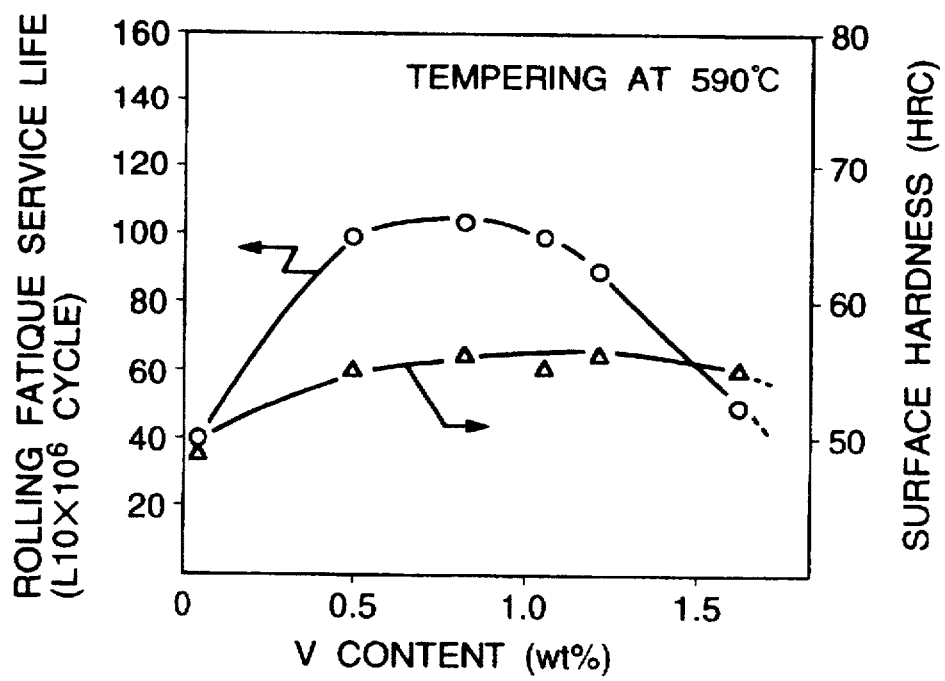
FIG. 6 is a diagram showing the relation between a vanadium content of samples tempered at 590° C. and a rolling fatigue service life, as well as the relation between the vanadium content and the hardness of a carburized surface.
Figure 7:
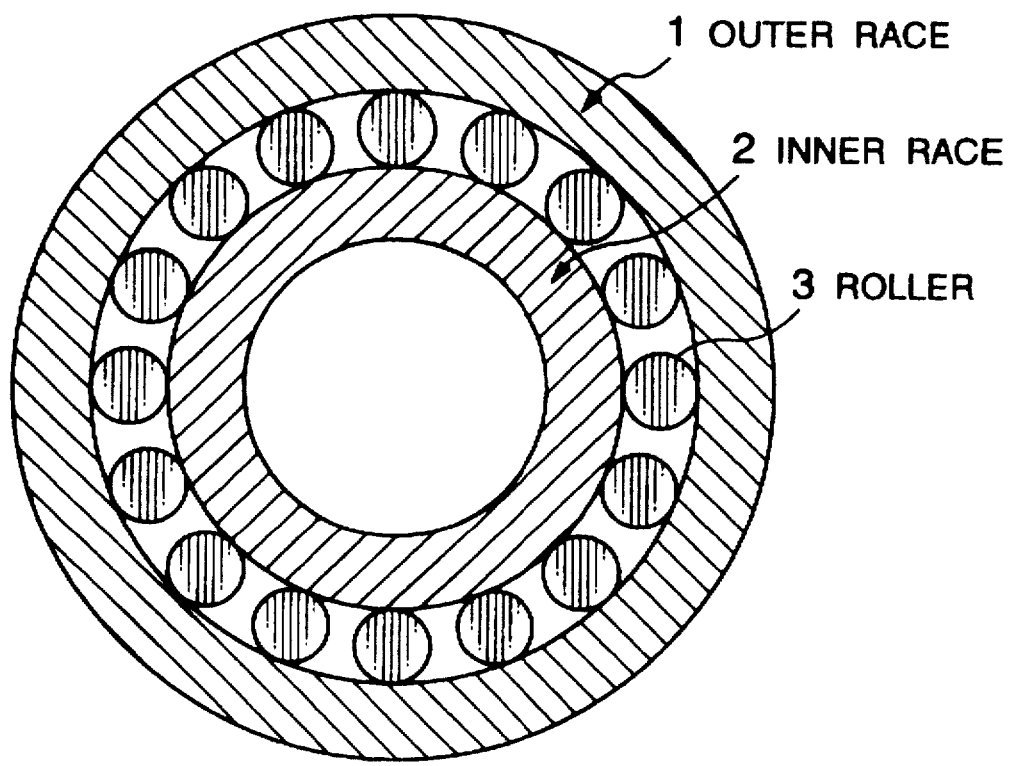
FIG. 7 is a partly sectional view of a roller bearing provided with the bearing members embodying the invention used as an inner race and/or an outer race.

FIG. 5 shows the rolling fatigue service life characteristics and the hardness of the carburized surface (from which the very thin outermost layer was removed) with respect to the samples tempered at 530° C., and FIG. 6 shows the rolling fatigue service life characteristics and the hardness of the carburized surface (from which the very thin outermost layer was removed) with respect to the samples tempered at 590° C.

As will be appreciated from FIGS. 5 and 6, the rolling fatigue service life is prolonged when the amount of addition of vanadium goes below 1.1%, so that the highly-reliable bearing members can be obtained.

When the vanadium content is less than 0.5% which is outside the range defined by the present invention, the hardness of the carburized surface decreases, and also the rolling fatigue service life is shortened.

This shortened rolling fatigue service life is due not only to the low hardness of the carburized surface but also to the fact that the amount of vanadium essential for keeping heat resistance of high-speed tool steel is not sufficient.

In both groups of samples tempered at 530° C. and 590° C., respectively, the rolling fatigue service life is the maximum when the vanadium content is in the range of from 0.5% to 1.1%, and therefore it is preferred that the vanadium content is 0.5~1.1%, and more preferably not more than 1.0%.

EXAMPLE 2

Materials, having respective compositions (having different vanadium contents) shown in Table 2, were melted and prepared by a vacuum melting method, and according to the same procedure as described above for Example 1, a rupture toughness value, the hardness of core portions, a Charpy impact value, the hardness of a carburized surface, and a rolling fatigue service life were evaluated.

Table 3 shows results of evaluation of those samples tempered at 530° C. Table 4 shows results of evaluation of those samples tempered at 590° C.

Sample No. 2 of the invention described in Example 1 is shown in Tables 3 and 4.

TABLE 2

| No | C | Si | Mn | Ni | Cr | W | Mo | V | Co | Nb | W + 2Mo | Fe | Ceq | Cv | Cv/Ceq | δ FERRITE AREA % | REMARK |
|---|---|---|---|---|---|---|---|---|---|---|---|---|---|---|---|---|---|
| 2 | 0.14 | 0.19 | 0.24 | 3.41 | 4.25 | — | 4.26 | 0.83 | — | — | 8.52 | Bal. | 0.69 | 0.17 | 0.24 | <0.1 | STEEL OF THE INVENTION |
| 7 | 0.20 | 0.18 | 0.23 | 3.43 | 4.23 | — | 4.24 | 0.81 | — | — | 8.48 | Bal. | 0.68 | 0.16 | 0.24 | <0.1 | STEEL OF THE INVENTION |
| 8 | 0.33 | 0.18 | 0.25 | 3.42 | 4.24 | — | 4.19 | 0.80 | — | — | 8.38 | Bal. | 0.68 | 0.16 | 0.24 | <0.1 | STEEL OF THE INVENTION |
| 9 | 0.13 | 0.20 | 0.23 | 3.43 | 5.02 | — | 4.20 | 0.82 | — | — | 8.40 | Bal. | 0.73 | 0.16 | 0.22 | <0.1 | STEEL OF THE INVENTION |
| 10 | 0.20 | 0.21 | 0.22 | 3.39 | 5.08 | — | 4.22 | 0.82 | — | — | 8.44 | Bal. | 0.74 | 0.16 | 0.22 | <0.1 | STEEL OF THE INVENTION |
| 11 | 0.13 | 0.19 | 0.20 | 3.40 | 5.10 | — | 2.51 | 0.81 | — | — | 5.02 | Bal. | 0.63 | 0.16 | 0.26 | <0.1 | STEEL OF THE INVENTION |
| 12 | 0.20 | 0.19 | 0.20 | 3.43 | 5.07 | — | 2.50 | 0.82 | — | — | 5.00 | Bal. | 0.63 | 0.16 | 0.26 | <0.1 | STEEL OF THE INVENTION |
| 13 | 0.18 | 0.19 | 0.20 | 3.41 | 6.10 | — | 2.53 | 0.80 | — | — | 5.06 | Bal. | 0.70 | 0.16 | 0.23 | <0.1 | STEEL OF THE INVENTION |
| 14 | 0.17 | 0.20 | 0.21 | 3.40 | 4.19 | — | 5.99 | 0.79 | — | — | 11.98 | Bal. | 0.78 | 0.16 | 0.20 | <0.1 | STEEL OF THE INVENTION |
| 15 | 0.13 | 0.21 | 0.22 | 3.41 | 4.15 | 4.11 | 2.02 | 0.82 | — | — | 8.15 | Bal. | 0.68 | 0.16 | 0.24 | <0.1 | STEEL OF THE INVENTION |
| 16 | 0.12 | 0.20 | 0.24 | 3.43 | 4.16 | 7.05 | — | 0.81 | — | — | 7.05 | Bal. | 0.66 | 0.16 | 0.25 | <0.1 | STEEL OF THE INVENTION |
| 17 | 0.12 | 0.17 | 0.20 | 3.42 | 4.20 | — | 4.22 | 0.82 | 7.11 | — | 8.44 | Bal. | 0.68 | 0.16 | 0.24 | <0.1 | STEEL OF THE INVENTION |
| 18 | 0.13 | 0.19 | 0.21 | 4.12 | 4.22 | — | 4.20 | 0.78 | — | — | 8.40 | Bal. | 0.67 | 0.16 | 0.23 | <0.1 | STEEL OF THE INVENTION |
| 19 | 0.12 | 0.19 | 0.23 | 3.41 | 4.23 | — | 4.21 | 0.82 | — | 0.05 | 8.42 | Bal. | 0.68 | 0.16 | 0.24 | <0.1 | STEEL OF THE INVENTION |
| 20 | 0.13 | 0.18 | 0.22 | 2.02 | 4.25 | — | 4.28 | 0.80 | — | — | 8.56 | Bal. | 0.68 | 0.16 | 0.24 | <0.1 | STEEL OF THE INVENTION |
| 21 | 0.13 | 0.19 | 0.22 | — | 4.26 | — | 4.29 | 0.84 | — | — | 8.58 | Bal. | 0.69 | 0.17 | 0.24 | 40.1 | COMPARATIVE STEEL |
| 22 | 0.13 | 0.18 | 0.24 | 3.40 | 3.07 | — | 4.25 | 0.83 | — | — | 8.50 | Bal. | 0.62 | 0.17 | 0.27 | <0.1 | COMPARATIVE STEEL |

TABLE 3

TEMPERING AT 530° C.

| No | CORE PORTION HARDNESS HRC | RUPTURE TOUGHNESS VALUE MPam$^{1/2}$ | 2U CHARPY IMPACT VALUE J/cm$^2$ | SURFACE HARDNESS HRC | ROLLING FATIGUE SERVICE LIFE L10 × 10$^6$ cycle | NOTE |
|----|---|---|---|---|---|---|
| 2  | 44.0 | 110 | 120 | 64.1 | 110 | STEEL OF THE INVENTION |
| 7  | 50.4 | 60  | 35  | 63.9 | 100 | STEEL OF THE INVENTION |
| 8  | 53.8 | 40  | 20  | 64.0 | 99  | STEEL OF THE INVENTION |
| 9  | 45.2 | 68  | 200 | 64.2 | 99  | STEEL OF THE INVENTION |
| 10 | 50.5 | 50  | 28  | 64.1 | 101 | STEEL OF THE INVENTION |
| 11 | 44.2 | 107 | 105 | 63.8 | 105 | STEEL OF THE INVENTION |
| 12 | 48.4 | 71  | 120 | 64.0 | 104 | STEEL OF THE INVENTION |
| 13 | 46.2 | 90  | 130 | 64.0 | 101 | STEEL OF THE INVENTION |
| 14 | 47.2 | 47  | 30  | 64.1 | 95  | STEEL OF THE INVENTION |
| 15 | 43.2 | 108 | 48  | 63.9 | 105 | STEEL OF THE INVENTION |
| 16 | 42.8 | 103 | 43  | 64.0 | 97  | STEEL OF THE INVENTION |
| 17 | 46.2 | 98  | 87  | 63.8 | 99  | STEEL OF THE INVENTION |
| 18 | 43.0 | 130 | 135 | 63.5 | 95  | STEEL OF THE INVENTION |
| 19 | 42.8 | 101 | 89  | 63.4 | 93  | STEEL OF THE INVENTION |
| 20 | 42.1 | 84  | 94  | 63.8 | 98  | STEEL OF THE INVENTION |
| 21 | 25.0 | 15  | 14  | 64.2 | 5   | COMPARATIVE STEEL |
| 22 | 45.3 | 63  | 64  | 63.2 | 84  | COMPARATIVE STEEL |

As shown in Table 2, Sample Nos. 7 and 8 of the invention have generally the same composition as that of Sample No. 2 except that the carbon content of the former is higher.

As shown in Table 3, as compared with Sample No. 2, Sample Nos. 7 and 8 are higher in hardness of the core portion, but are lower in rupture toughness. Therefore, to simply increase the carbon content is effective when the strength has preference to the rupture toughness.

Incidentally, when the tempering temperature increases, the hardness is lowered while the toughness can be increased. With respect to Sample No. 7 with the higher carbon content tempered at the higher temperature of 590° C., it will be appreciated from Table 4 that the hardness of the core portion of Sample No. 7 is 46.4 HRC and that the rupture toughness value is 132 MPam$^{1/12}$.

This hardness and this rupture toughness value are both higher than those of Sample No. 2 in Table 3, respectively, compared with the case where the carbon content is lower, and by doing so, the high strength and the high toughness are compatible with each other, and this is desirable for the bearing member.

Sample No. 8 with the carbon content of 0.33%, though tempered at the higher temperature of 590° C., failed to achieve the rupture toughness value obtained with Sample No. 2 of Table 3. This indicates that it is preferred that the carbon content should be not more than 0.3%.

Sample Nos. 9 and 10 of the invention with a higher chromium content than that of Sample No. 2 of the invention are higher in hardness than Sample No. 2, and are slightly lower in rupture toughness than Sample No. 2.

Sample No. 11 of the invention, higher in chromium content but lower in molybdenum content than Sample No. 2 of the invention, are generally equal to Sample No. 2. Sample No. 12 of the invention, higher in chromium content

TABLE 4

TEMPERING AT 590° C.

| No | CORE PORTION HARDNESS HRC | RUPTURE TOUGHNESS VALUE MPam$^{1/2}$ | 2U CHARPY IMPACT VALUE J/cm$^2$ | SURFACE HARDNESS HRC | ROLLING FATIGUE SERVICE LIFE L10 × 10$^6$ cycle | NOTE |
|----|---|---|---|---|---|---|
| 2  | 39.6 | 210 | 230 | 60.8 | 104 | STEEL OF THE INVENTION |
| 7  | 46.4 | 132 | 85  | 60.4 | 105 | STEEL OF THE INVENTION |
| 8  | 48.6 | 93  | 65  | 60.3 | 103 | STEEL OF THE INVENTION |
| 9  | 40.4 | 220 | 320 | 60.6 | 105 | STEEL OF THE INVENTION |
| 10 | 46.0 | 131 | 85  | 60.7 | 95  | STEEL OF THE INVENTION |
| 11 | 40.8 | 200 | 250 | 60.0 | 110 | STEEL OF THE INVENTION |
| 12 | 46.0 | 120 | 210 | 60.0 | 100 | STEEL OF THE INVENTION |
| 13 | 41.0 | 220 | 290 | 59.6 | 99  | STEEL OF THE INVENTION |
| 14 | 43.1 | 112 | 70  | 59.7 | 100 | STEEL OF THE INVENTION |
| 15 | 39.4 | 150 | 105 | 59.8 | 100 | STEEL OF THE INVENTION |
| 16 | 39.7 | 120 | 100 | 60.1 | 101 | STEEL OF THE INVENTION |
| 17 | 41.2 | 145 | 98  | 60.2 | 107 | STEEL OF THE INVENTION |
| 18 | 40.1 | 240 | 250 | 60.3 | 100 | STEEL OF THE INVENTION |
| 19 | 40.0 | 195 | 185 | 59.9 | 95  | STEEL OF THE INVENTION |
| 20 | 40.1 | 160 | 175 | 60.2 | 107 | STEEL OF THE INVENTION |
| 21 | 23.6 | 34  | 32  | 60.8 | 7   | COMPARATIVE STEEL |
| 22 | 44.2 | 110 | 124 | 59.4 | 98  | COMPARATIVE STEEL |

As will be appreciated from this, when the carbon content is increased, the tempering temperature is made higher as and carbon content but lower in molybdenum content than Sample No. 2, is increased in hardness of the core portion;

however, when Sample No. 12 is tempered at 590° C. so as to adjust the hardness of the core portion to about 46 HRC, Sample No. 12 has a high rupture toughness value and a high Charpy impact value.

This tendency is also seen in Sample No. 13 higher in chromium content than Sample No. 12.

Sample Nos. 15 and 16, which have generally the same composition as that of Sample No. 2 except that part or the whole of molybdenum is replaced by tungsten, have generally the same toughness as that of Sample No. 2.

Sample No. 17, having cobalt added thereto, is enhanced in hardness, but is lower in toughness than Sample No. 2.

Sample No. 19, having niobium added thereto, is lower in toughness than Sample No. 2 of the invention.

A comparison between Sample No. 18 of the invention higher in nickel content than Sample No. 2 of the invention, Sample No. 20 lower in nickel content than Sample No. 2, and Sample No. 21 without nickel indicates that the addition of nickel markedly increases the rupture toughness value.

In Sample No. 21 without nickel, an extremely large amount of δ ferrite is present in the structure, so that the hardness of the core portion is below 30 HRC. Thus, this sample fails to have a sufficient core portion hardness to serve as a bearing member.

A comparison between Sample No. 2 of the invention and a comparative sample lower in chromium content than Sample No. 2 indicates that the comparative sample with the chromium content of about 3% is much lower in rupture toughness value and Charpy impact value than the sample of the invention. This is not desirable.

When the bearing steel of the present invention has the hardness, for example, of about 44 HRC so as to impart sufficient strength to the core portion of the bearing member, the excellent rupture toughness value of not less than 100 MPam$^{1/2}$ (maximum value) can be obtained. Namely, in the present invention, the performance of the bearing member can be enhanced without the sacrifice of one of the two properties contrary to each other, that is, the toughness and the high hardness.

Therefore, the bearing steel of the present invention is best suited for use as a bearing member of a gas turbine or the like which is expected to bear a higher load.

What is claimed is:

1. Martensitic Fe-based bearing steel which is carburized in use, containing by weight, not more than 0.1 to 0.3% carbon, not more than 1% silicon, not more than 1% manganese, 1 to 5% nickel, 3.5 to 7.0% chromium, at least one of tungsten and molybdenum and tungsten equivalent defined by ([W]+2[Mo]) of which at least one is 3 to 12%, and not less than 0.5% but less than 1.0% vanadium, a ratio of Cv/Ceq being not more than 0.3 where Cv represents a carbon equivalent of vanadium defined by 0.2[V] and where Ceq represents a carbon equivalent of carbide-forming elements defined by (0.063[Cr]+0.06[Mo]+0.033[W]+0.2[V]).

2. Martensitic Fe-based bearing steel according to claim 1, wherein an amount of δ ferrite occurring at an austenitic temperature is less than 0.1% by area.

3. Bearing steel according to claim 1, in which part of Fe is replaced by not more than 10% Co.

4. A bearing member composed of martensitic Fe-based bearing steel, comprising a carburized layer formed in part or the whole surface of said bearing member, and a core portion except said carburized layer, said core portion contains, by weight, not more than 0.1 to 0.3% carbon, not more than 1% silicon, not more than 1% manganese, 1 to 5% nickel, 3.5 to 7.0% chromium, at least one of tungsten and molybdenum and tungsten equivalent defined by ([W]+2[Mo]) of which at least one is 3 to 12%, and not less than 0.5% but less than 1.0% vanadium, a ratio of Cv/Ceq being not more than 0.3 where Cv represents a carbon equivalent of vanadium defined by 0.2[V], and where Ceq represents a carbon equivalent of carbide-forming elements defined by (0.063[Cr]+0.06[Mo]+0.033[W]+0.2[V]), said bearing member being excellent in heat resistance and toughness.

5. A bearing member according to claim 4, wherein an amount of δ ferrite in said core portion is less than 0.1% by area.

6. A bearing member according to claim 4, in which part or the whole of Fe contained in said core portion except said carburized layer is replaced by not more than 10% Co.

7. A bearing member according to claim 4 or claim 6, in which residual compressive stresses are present in said carburized layer.

* * * * *